United States Patent [19]

Noguchi et al.

[11] Patent Number: 4,901,430
[45] Date of Patent: Feb. 20, 1990

[54] METHOD OF MOUNTING A MAGNETIC HEAD

[75] Inventors: Ichiro Noguchi, Nagaoka; Kazuo Kobayashi, Furukawa; Toru Sawada, Furukawa; Masao Okita, Furukawa; Yasunari Takayama, Yokohama; Kazuo Kozumi, Furukawa, all of Japan

[73] Assignee: Alps Electric Co., Ltd., Tokyo, Japan

[21] Appl. No.: 219,888

[22] Filed: Jul. 19, 1988

Related U.S. Application Data

[63] Continuation of Ser. No. 908,508, Sep. 16, 1986, abandoned.

[30] Foreign Application Priority Data

Sep. 18, 1985 [JP] Japan .................................. 60-204395

[51] Int. Cl.<sup>4</sup> ................................................ G11B 5/42
[52] U.S. Cl. .......................................... 29/603; 29/467;
264/261; 264/272.16; 360/104
[58] Field of Search .................. 29/603, 467; 360/103, 360/104; 264/261, 272.16

[56] References Cited

U.S. PATENT DOCUMENTS 3,819,348  6/1974  Murray ............................... 29/603 X
4,487,649 12/1984  Gyi et al. ........................... 29/603 X
4,540,423  9/1985  Fuchs ................................. 29/603 X Primary Examiner—Carl E. Hall
Attorney, Agent, or Firm—Guy W. Shoup; David W. Heid; Norman R. Klivans

[57] ABSTRACT

A method of mounting a magnetic head to a case employs a jig having a grooved placing unit for placing the head and a support for the case formed at a predetermined height from the slidably contacting surface of the head. The method includes placing the slidably contacting surface of the head on the bottom of the placing unit of the jig to position the head in the placing unit, placing the case on the support to set its height at a predetermined gap with respect to the mounting surface of the head, and filling a bonding agent in the gap between the mounting surfaces of the case and the head.

4 Claims, 3 Drawing Sheets

METHOD OF MOUNTING A MAGNETIC HEAD

This application is a continuation of application Ser. No. 908,508, filed 9/16/86, now abandoned.

BACKGROUND OF THE INVENTION

This invention relates to a method of mounting a magnetic head in a magnetic head assembly to read and write information on both sides of a magnetic recording medium formed in a disk shape and more particularly to a method of attaching a magnetic head in a magnetic head assembly of the type for fastening the head in a case.

PRIOR ART

There have been three types of conventional assemblies having magnetic heads supported by a gimbal spring in a double-sided recording type disk drive for reading and writing on both sides of a magnetic recording medium (hereinafter referred to as "a disk") formed in a disk shape. One assembly is a lower stationary, upper movable type having an upper magnetic head supported on a gimbal spring provided on an upper case. Another assembly is an upper stationary, lower movable type having a lower magnetic head supported on a gimbal spring provided on a carriage. A third assembly is an upper movable and lower movable type having upper and lower heads gimbal springs provided on both a carriage and a case. The lower stationary, upper movable type is widely used with an advantage that a reference surface can be readily provided because the carriage on the lower side is guided directly on a guide rod. However, the upper stationary, lower movable type has the disadvantage that a reference surface is hard to set since a case is supported rotatably on the carriage. The upper movable, lower movable type has good follow-up action, but a reference surface is much harder to set, and this type is not accordingly employed in a practical use at present.

The upper stationary, lower movable type is harder to set the reference surface as compared with the lower stationary, upper movable type, but is considered to improve the follow-up action, and is expected to be used in future developments. The lower stationary, upper movable type has two movable sections in the gimbal spring and a coupler of the case with the carriage at the upper side. Thus, when following up the deformation of the disk, secondary delay occurs in the follow-up actions of the two sections, thereby causing the follow-up action to be deteriorated. However, the upper stationary, lower movable type does not vary the position of the magnetic head on the upper side, and has only one movable section for the magnetic head on the lower gimbal spring. Thus, secondary follow-up action is not delayed, and is considered to be advantageous in the follow-up action. Japanese Patent Laid Open No. 147160/1982 has been proposed for this aspect. This is shown in FIG. 2.

A magnetic head supporting mechanism in FIG. 2 has an arm (case) 34 for placing a magnetic head 32, and a carriage 36 for carrying a magnetic head 33. The arm 34 is rotatably mounted through a leaf spring hinge 35 projected from the side 36a of the carriage 36, and a predetermined load pressure is obtained by a coiled spring 37 attached to the top 36b of the carriage 36. The head 32 on the upper side is fastened directly to the lower surface of the arm 34, and the head 33 on the lower side is mounted on the upper surface of the carriage 36 through a gimbal plate 38. Thus, the heads 32, 33 are opposed through a disk (flexible disK) 31. A supporting plate spring 41 having a pivot 40 at the end is provided in a through hole 39 formed at the lower portion 36c of the carriage 36 bearing on the lower surface of a gimbal plate 38 to press the plate 38 from below to the disk 31 side.

The inventor of the present invention has proposed a method of mounting a magnetic head by more accurately setting the reference surface of the magnetic head 32 on the arm 34 for the above conventional example. This will be described with reference to FIG. 3.

FIG. 3 is a sectional view of a magnetic head assembly of the above prior invention. In FIG. 3, the magnetic head assembly has a lower magnetic head assembly 2 and an upper magnetic head assembly 30, and is fed radially of a disk 5 along a guide shaft 4 by a pulse motor, not shown.

The lower head assembly (hereinafter referred to as "a carriage") 2 is mounted at the end with a lower magnetic head 7 through a gimbal spring 6, and has a flexible printed board 9 connected to lead wires 8 led from the head 7, and a lead terminal 10 connected with the board 9 and projected to the end of the carriage 3. The terminal 10 is insert molded with insulating synthetic resin by dividing a conductive metal plate into five segments, and extended at one end to the spring 6. The carriage 2 molded by the mold also has a pivot 11 contacted with the lower surface of the spring 6 at the head 7 for pressing it in contact with the disk 5, and a support 12 having a cylindrical contacting surface for the pivot 11 in direct contact with the case 3.

The upper head assembly 30 has a case 3 and a clamping plate 16, and a left hinge spring 14 for rotatably supporting the case 3 to the plate 16, and an upper magnetic head 13 is fastened through a plate 21 to the position opposed to the lower magnetic head 7 at the carriage 2 side. The case 3 further has a load spring 19 extended from a retainer 18 in contact with the case 3 to elastically press it toward the carriage 2. The elastic force of the spring 19 is adjusted by a load pressure adjusting screw 20 attached to the retainer 18.

The plate 21 and the leaf hinge spring 14 provided in the upper head assembly 30 are formed, for example, by insert molding a conductive spring material and cutting it in a predetermined shape, and the spring 14 disposed at one end in the vicinity of the fixed plate 21 divided, for example, into five segments. Five lead wires 22 led from the head 13 mounted via a bonding agent to the plate 21 are connected to the five divided ends of the spring 14 as lead terminals. The five wires 22 are used three for reading/writing and two for erasing.

The case contacted with the support 12 of the carriage 2 is formed with a retainer 3a projected sidewards of the hinge 14a of the spring 14. The case 3 is rotatable along the cylindrical surface of the support 12. Thus, the height position of the case 3 is defined by the height of the contact of the support 12 and the mounting height of the plate 16 on the spring 14. The plate 16 is fastened to the base 15 by a mounting screw 17 by setting optimally the height from the support 12. A retainer 17a projected above the retainer 3a prevents the variation in the height direction of the case 3 due to external vibration of impact, thereby preventing the heads 7, 13 from being damaged. The shielding plates 23, 24 are mounted on the lower surface of the lower head 7 and the upper surface of the head 13, thereby preventing a noise.

As described above, the case 3 is rotatably supported by the spring 14, and the case 3 is positioned in height by the support 12 provided on the carriage 2. Then, the height position of the head 13 can be specified to improve the accuracy of the reference surface.

However, setting an azimuth angle of the carriage movement relative to the disk is another problem in addition to the height of the disk 5 relative to the positions of the heads 7, 13. The azimuth is determined by the mounting angle of the heads 7, 13 on the carriage 2 in the horizontal direction and the feeding angle of the carriage 2 with respect to the disc. The feeding angle of the carriage 2 is determined by guide means for the carriage 2, i.e., the inclining angle with respect to the rotating center of the disk and of the guide rod 4.

In order to unitarily determine the inclining angle of the guide rod 4 with respect to the rotating center of the disk, the inventor of the present invention has proposed a prior invention for forming the bearing of a disk drive motor in a cylindrical shape at the rotating center of the disk as a center, fastening the cylindrical surface in contact with the guide rod 4, and disposing the guide rod 4 in the tangential direction of the tracks of the disk 5. This prior invention will be also described briefly in FIGS. 4 and 5.

In FIGS. 4 and 5, a stepped portion 60b is formed in parallel with the rotating direction of a turntable 61 on the outer periphery of a bearing 60a of a motor 60, and the stepped portion 60b is finished so that the height of the upper surface B of the turntable 61 becomes a predetermined height $h_1$ with respect to the upper surface of the stepped portion 60b. A cylindrical portion 60c of small diameter up to the stepped portion 60b is formed vertically to the portion 60b, i.e., in a cylindrical shape with the rotating center of the disk as a center. One end of the guide rod 4 for guiding the carriage 2 is placed on the stepped portion 60b, pressed to the cylinder 60c by a thin elastic plate 35, and mounted on the bearing surface formed as the stepped portion 60b of the bearing 60a of the motor 60.

As described above, the stepped portion 60b is formed in a predetermined height $h_2$ from the reference surface F of the motor 60 on the bearing 60a of the motor 60, and the cylinder 60c is simultaneously formed vertically to the rotating surface of the disk, and the rod 4 is pressed and mounted to the corner formed by the portions 60b and the cylinder 60c. Then, the position in the height direction is defined by the height $h_2$ of the upper surface E with respect to the reference surface F of the stepped portion 60b, and the position in the horizontal direction is defined by the radius R of the cylinder 60c from the rotating center of the motor 60 as shown in FIG. 5.

Thus, when the position of the rod 4 in the horizontal direction is directly defined by the cylinder 60c formed on the bearing 60a of the motor 60, the azimuth can be accurately defined for the angle of the head 7 with respect to the feeding direction of the carriage 2 on the rod 4. In other words, even if the accuracy of mounting the end 4a to the housing 63 of the rod 4 is not accurate, the rod 4 is disposed in the tangential direction of the cylinder 60c of the bearing 60a of the motor 60, the relative position of the rod 4 with respect to the cylinder 60c does not alter, and the angle of the head with respect to the tracks of the disk does not vary. Therefore, even when the carriage 2 is assembled in the housing 63, the azimuth does not become displaced since the housing 63 does not affect the dimensional accuracy. Thus, the head 13 of the case 3 is set with respect to the head 7 to the carriage 2 accurate in azimuth, and the head height can be set for the reference surface of the disk when loading the head by the predetermined height and the horizontality of the case 3.

However, the azimuth of the head 13 to the case 3 side is simultaneously adjusted with the relative position of the head by optical or magnetic means upon assembly to the carriage 2.

In this connection, when the head 13 is mounted in the case 3, the head 13 is held by a chuck unit for freely adjusting the position of the head 13 with respect to the case 3 to a predetermined planar degree, the height and the parallelism of the slidably contacting surface of the head 13 are finely adjusted by a microscope, the head 13 is temporarily clamped via a rapid drying adhesive to the case 3, and then the adhesive flows while hardening into the gap between the back surface of the head 13 and the case 3.

This fastening method is effective for adjusting the parallelism and the height of the slidably contacting surface of the head but it takes time to adjust, and is expensive in the assembling cost. Particularly, in the above upper stationary, lower movable type, the unnecessary adjustment of the azimuth of the carriage and lower head is avoided, and the upper head need only be set to the proper height and parallelism with the case. Therefore, an easier method of mounting the head 13 in the case is desirable, in order to avoid the complicated adjustment of the head in excessive degrees of freedom using the microscope.

SUMMARY OF THE INVENTION

It is therefore an object of the invention to provide a method of mounting a magnetic head capable of simply and accurately attaching the head without using a microscope or adjusting means having excessive degrees of freedom.

In order to achieve the above object of the invention, there is provided a method of mounting a magnetic head with a jig having a grooved placing unit for placing the head and a support for a case formed at a predetermined height from the slidably contacting surface of the head comprising the steps of placing the slidably contacting surface of the head on the bottom of the placing unit of the jig to position the head in the placing unit, placing the case on the support set in height with respect to the mounting surface of the head, and filling a bonding agent in the gap between the mounting surfaces of the case and the head, thereby mounting the head in the case through the above steps.

According to the method of the invention, the placing unit of the grooved head for defines the height of the slidably contacting surface from the mounting surface of the case, and the jig is formed with the support for supporting the case on the upper surface. Thus, the height and the parallelism can be unitarily defined. Therefore, the head is placed in the placing unit, the case is placed on the jig from above, and a bonding agent is merely filled in the gap formed between the head and the case and solidified, thereby simply defining the height of the head and its parallelism.

The above and other objects, features and advantages of the present invention will become apparent from the following detailed description of a preferred embodiment when taken in conjunction with the accompanying drawings.

DESCRIPTION OF THE PREFERRED EMBODIMENTS

Figure 1A:
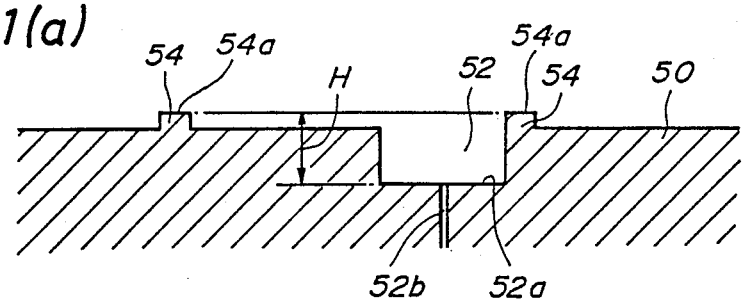
FIGS. 1(a), 1(b), 1(c) and 1(d) are explanatory views showing an embodiment of a method of mounting a magnetic head according to the present invention.

An embodiment of a magnetic head assembly according to the present invention will be described with reference to the accompanying drawings.

FIG. 1 is an explanatory view of an embodiment of a method of mounting a magnetic head according to the invention. In FIG. 1(a), a jig 50 has a groove placing unit 52 for placing a magnetic head 51 at the center, a pair of supports 54 projected upward for placing a case 53 thereon, and the bottom 52a of the placing unit 52 and the upper surface 54a of each support 54 formed parallel to one another and with a predetermined height H. The height H is from the slidably contacting surface 51a of the head 51 to the case 53. An air flow passage 52b capable of intaking air from the placing unit 52 is opened at the bottom 52a of the placing unit 52.

The method of mounting the head of the invention comprises the following three steps with the jig 50.

Figure 1B:
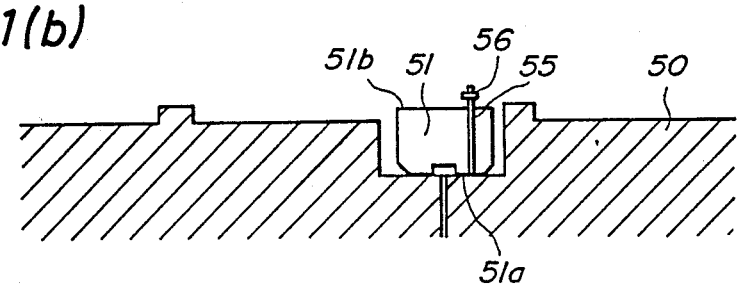

The first step is, as shown in FIG. 1(b), placing the head 51 in the placing unit 52 of the jig 50, and the slidably contacting surface 51a of the head 51 is contacted with the bottom 52a of the placing unit 52 at this time. When the head 51 is set, air is sucked from the passage 52b, and the head 51 is held to the bottom 52a in a non-permanent state. In this case, air is evacuated by negative pressure at the slidably contacting surface 51a of the head 51 to hold the head 51 by utilizing the atmospheric pressure. However, the necessary accuracy can be provided even without particularly holding the head.

Figure 1C:
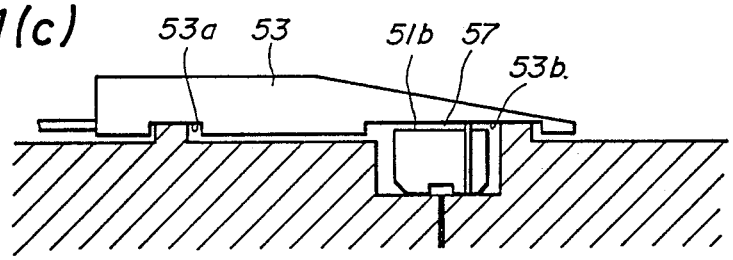
Figure 3:
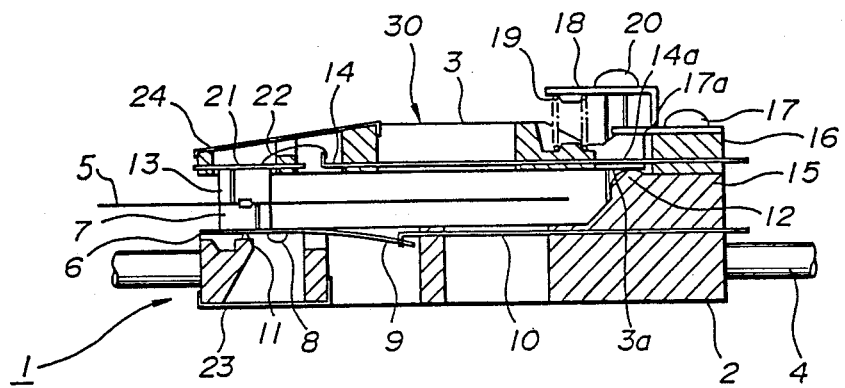
Figure 4:
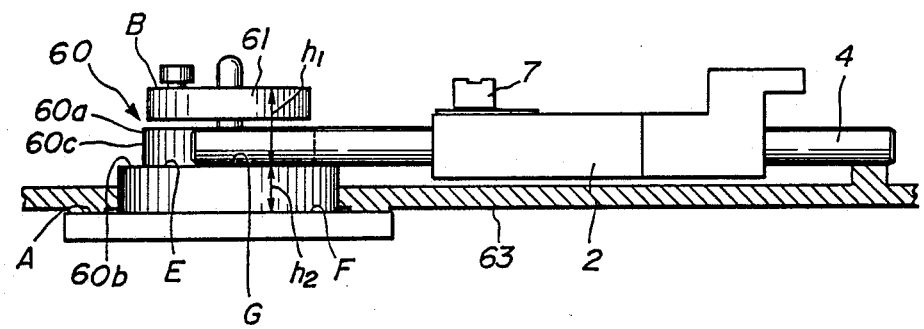
FIG. 4 is a partial sectional side view showing the mounting state of a motor and a carriage.
Figure 5:
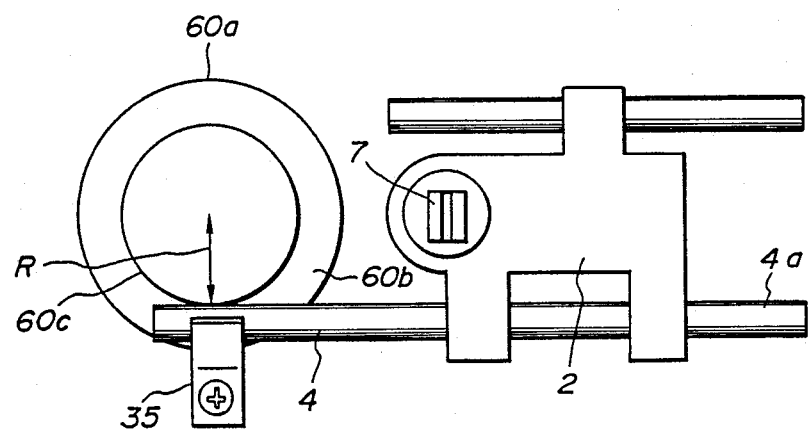
FIG. 5 is a plan view of the essential part of FIG. 4.

The second step is, as shown in FIG. 1(c), placing the case 53 on the supports 54 of the jig 50 to support it from the bottom 52a by a predetermined height H. A reference surface 53a and the mounting surface 53b for the head 51 are formed in the same plane on the lower surface of the case 53. Thus, when the reference surface 53a and the mounting surface 53b are placed on the supports 54, the bottom 52a of the placing unit 52 and the mounting surface 53b are defined in parallel at the predetermined height H. Thus, the slidably contacting surface 51a and the mounting surface 53a are in parallel and spaced by the height H. The mounting surface 53b is concretely formed, for example, as a plate 21 of the case 3 shown in FIG. 3. Therefore, as shown in FIG. 1(b), when penetrating holes for receiving a core 55 and a coil 56 of the head 51 are formed in the plate 21, the mounting surface 53b can be located opposite to the mounting surface 51b of the head 51.

As is well understood in this field, core 55 is a core element for the read/write functions of the head 51, and coil 56 is wound around a leg portion of the core 55 for providing a current flow when a magnetic field is applied to or to be generated from the core 55. Since these elements are considered conventional, they are not described further herein.

Figure 1D:
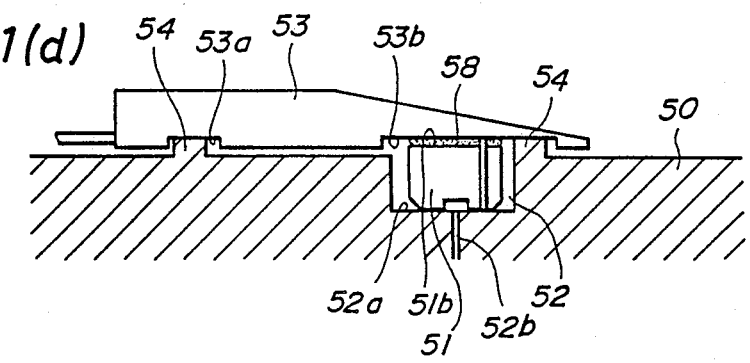
Figure 2:
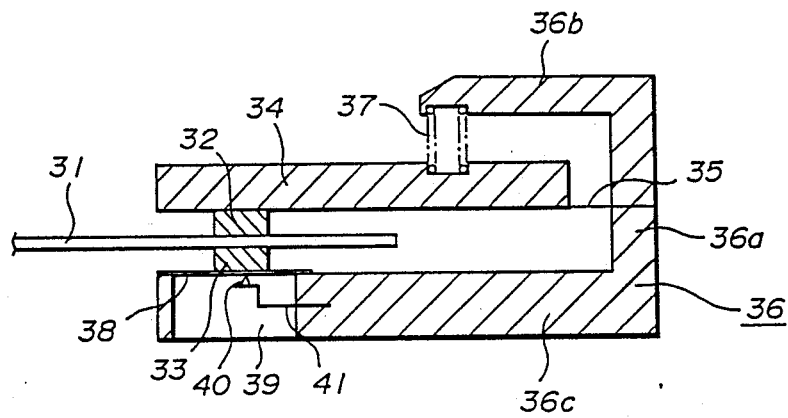
FIGS. 2 and 3 are sectional views showing a magnetic head assembly of the upper stationary, lower movable type.

As described above, when the relative position between the head 51 and the case 53 is defined, the method is completed by the third step. The third step is, as shown in FIG. 1(d), filling a bonding agent 58 in a gap 57 formed between the mounting surface 53a of the case 53 and the mounting surface 51b of the head 51 to mount the head 51 to the case 53. Ordinarily, a quick drying bonding agent 58 is used to form a bond therebetween, the intake of the air from the passage 52b is stopped, the case 53 to which the head 51 is mounted is removed from the jig 50, and the head 51 is then bonded to the case 53.

When the head 51 is mounted on the case 53 through the above steps using the jig 50, the specified height H and the parallelism of the mounting surface 53b of the case 53 can be defined even without particular adjustment. Thus, the disk reference surface may be accurately set simply. The method of mounting the head does not need the three-dimensional adjustment of the head 51, and can mount the head in a very short time.

According to the invention as described above, the jig for unitarily setting the height and the parallelism of the slidably contacting surface of the head to the case is used to mount the head. Thus, the head can be simply and accurately mounted in the case. The adjusting time can be largely shortened as compared with the conventional method, and assembling cost can be reduced correspondingly.

What is claimed is:

1. A method of mounting an upper magnetic head, having a sliding contact surface on a lower side and a mounting surface on an upper side thereof, to one end of a pivotable case which extends longitudinally over a carriage supporting a lower magnetic head, said upper magnetic head being mounted precisely to said one end of said case such that when said case is pivoted downwardly toward said carriage, said upper magnetic head faces opposite said lower magnetic head on opposite sides of a magnetic disk interposed in a plane therebetween, said case being provided with a mounting surface on said one end for mounting the magnetic head, comprising:

employing a jig having a grooved placing unit with a bottom surface formed downwardly in the jig and a pair of supports projecting upwardly from the jig by a predetermined height above, and spaced apart longitudinally and in parallel with, the bottom surface of the groove placing unit;

placing the sliding contact surface of the head on the bottom surface of the placing unit of the jig to position the head therein;

placing the case longitudinally on the pair of supports so that its mounting surface on said one end thereof is located opposite the mounting surface of the upper side of said head and spaced from the contact surface placed on the bottom surface of said placing unit by a predetermined spacing determined by the predetermined height of the supports; and filling a bonding agent in a resulting gap between the mounting surfaces of the head and the case created by said predetermined spacing and allowing the head and case to bond together.

2. A method of mounting a magnetic head according to claim 1, wherein said first placing step includes intaking air from a passage in said placing unit to hold the head to the bottom of said placing unit in a non-permanent state.

3. A method of mounting a magnetic head according to claim 2, wherein said third filling step includes filing a quick drying bonding agent, then the intake of the air from the passage of said placing unit is stopped, the case in which the head is mounted is removed from the jig, and the head is then bonded to the case.

4. A method of mounting a magnetic head according to claim 1, wherein in said second placing step, at least one penetrating hole is formed in the mounting surface of the case, the mounting surface of the case is located opposite to the mounting surface of the head at a predetermined distance from the contact surface of the head.

* * * * *